United States Patent
Kono et al.

(10) Patent No.: US 7,354,984 B2
(45) Date of Patent: Apr. 8, 2008

(54) METHOD FOR DRYING NONIONIC ALKYLENE OXIDE-TYPE WATER-SOLUBLE RESIN, METHOD FOR PACKAGING IT, AND METHOD FOR TRANSPORTING IT

(75) Inventors: Michiyuki Kono, Neyagawa (JP); Manabu Kikuta, Kyotanabe (JP); Masaki Tezuka, Kusatsu (JP); Hiroshi Tanaka, Kobe (JP); Takao Yokohashi, Higashiomi (JP); Takao Nishihata, Otsu (JP); Kazuhiko Murata, Suita (JP); Taketo Toba, Takarazuka (JP); Fumihide Tamura, Kusatsu (JP); Ritsuo Kitada, Takatsuki (JP)

(73) Assignees: Dai-ichi Kogyo Seiyaku Co., Ltd., Kyoto (JP); Nippon Shokubai Co., Ltd., Osaka (JP)

( * ) Notice: Subject to any disclaimer, the term of this patent is extended or adjusted under 35 U.S.C. 154(b) by 111 days.

(21) Appl. No.: 11/062,151

(22) Filed: Feb. 18, 2005

(65) Prior Publication Data

US 2005/0211956 A1    Sep. 29, 2005

(30) Foreign Application Priority Data

Feb. 19, 2004  (JP)  ............................ 2004-043470
Feb. 19, 2004  (JP)  ............................ 2004-043500
Feb. 19, 2004  (JP)  ............................ 2004-043518
Feb. 23, 2004  (JP)  ............................ 2004-046702

(51) Int. Cl.
    *C08G 18/08* (2006.01)
(52) U.S. Cl. ................. 528/50; 106/122; 106/132.1; 252/385; 428/35.6
(58) Field of Classification Search ............... 106/122, 106/132.1; 252/385; 428/35.6; 528/50
    See application file for complete search history.

(56) References Cited

U.S. PATENT DOCUMENTS 4,882,564 A    11/1989  Monroe et al.
5,043,196 A *  8/1991   Lacourse et al.

FOREIGN PATENT DOCUMENTS

| EP | 08192821 | 7/1996 |
|---|---|---|
| EP | 1327650 | 7/2003 |
| GB | 1536835 | 12/1978 |
| JP | 54-58591 | 5/1979 |
| JP | 62-131180 | 6/1987 |
| JP | 2-77587 | 6/1990 |
| JP | 5032991 | 4/1993 |
| JP | 7-316223 | 12/1995 |
| JP | 8-192821 | 7/1996 |
| JP | 2002017318 | * 1/2002 |
| JP | 2002-128885 | 5/2002 |
| JP | 2003-012599 | 1/2003 |
| JP | 2002-1727 | 7/2003 |
| JP | 2003212213 | * 7/2003 |
| JP | 2003-277497 | 10/2003 |
| WO | WO- 93/00391 | 1/1993 |

OTHER PUBLICATIONS

1986 Encyclopedia of Polymer Science and Engineering Wiley Interscience vol. 6 pp. 225-322.*

* cited by examiner

*Primary Examiner*—Terressa Boykin
(74) *Attorney, Agent, or Firm*—Jordan and Hamburg LLP

(57) ABSTRACT

To efficiently dry it, a nonionic alkylene oxide-type water-soluble resin is put into a container, then the container is degassed to a prescribed vacuum degree which is maintained while a dry gas having a dew point not higher than prescribed is introduced into the container at a rate not lower than prescribed. Minor volatiles are efficiently removed from the resin in an evaporation tank having a stirring blade. For protecting the dried resin from water, a dry gas is introduced into and air is purged from an empty packaging container whereafter the resin is charged into the container is sealed. By controlling solvent content and visocity of the resin and loading it into a temperature-controlled transportation container and/or unloading it out of the transportation container by the use of a pump, good subsequent processability of the resin and prevention of deterioration thereof are ensured.

11 Claims, 4 Drawing Sheets

METHOD FOR DRYING NONIONIC ALKYLENE OXIDE-TYPE WATER-SOLUBLE RESIN, METHOD FOR PACKAGING IT, AND METHOD FOR TRANSPORTING IT

BACKGROUND OF THE INVENTION

The present invention relates to a method for drying a nonionic alkylene oxide-type water-soluble resin, and to a nonionic alkylene oxide-type water-soluble resin dried according to the method. The invention also relates to a method for packaging the resin and to a packaging material for it. The invention further relates to a method for transporting a nonionic alkylene oxide-type water-soluble resin.

For obtaining resin of high purity and good processability on an industrial scale, heretofore generally employed is (1) a method of precipitating a polymer by the use of a bad solvent after solution polymerization to produce it, then separating it through filtration or centrifugation, and drying it into powder; or (2) a method of separating a polymer through filtration or centrifugation after precipitation polymerization to produce it, followed by drying the resulting into powder, and finally, the thus-dried and pelletized or powdered resin is stocked for a material for various applications.

Nonionic alkylene oxide-type water-soluble resin such as ethylene oxide-type resin (e.g., see Herman F. Mark, Norbert M. Bikales, Charles G. Overberger, George Menges, *Encyclopedia of Polymer Science and Engineering*, Vol. 6, USA, Wiley Interscience, 1986, pp. 225–322) is used for various applications these days. In particular, ethylene oxide-butylene oxide copolymer (hereinafter it may be referred to as EO-BO copolymer) resin has a possibility of expressing excellent electrochemical characteristics, and its usefulness is specifically noticed as a material for electrochemical devices such as cells.

However, powder and pellets of nonionic alkylene oxide-type water-soluble resin rapidly absorb water in the environment, and when left in an ordinary environment, they may absorb water to have a water content of from thousands to tens of thousands ppm within about 10 minutes. Since the organic solvent and water in the resin may have close relation to the physical properties and the electric properties of the resin, it is an important theme to reduce them.

For drying resin, for example, employed is a method of introducing dry air into a pelletized or powdery resin product stored in a storehouse, as in JP-A7-316223. However, the method is problematic in that it is difficult to uniformly and entirely dry the resin product within a short period of time according to the method and the drying efficiency of the method is low.

JP-A 2002-1727 proposes a method comprising jetting a hot gas into a store tank of resin pellets, keeping them static in the condition for a predetermined period of time, then taken out the pellets from the store tank, and thereafter again returning them into the store tank, and the method is repeated for drying the resin pellets. In the hot air drying method, air does not contain an organic solvent. Therefore, the method is suitable for removing an organic solvent such as heptane to dry resin.

However, when water is removed according to the method, it is difficult to dry the resin so as to make it have a water content of at most 1% (thousands ppm) since air contains water. In particular, it is extremely difficult to reduce the water content of the dried resin to at most hundreds ppm. In addition, the step of taking the pellets out of the store tank, again returning them to it, and repeating this operation has another problem in that it requires a large-scale apparatus since a condition that the resin is kept out of contact with air during the treatment is indispensable to the step. Even when dry hot air is used, an amount of the air of, for example, at least 100 m$^3$/hr/t and a long drying time are necessary (e.g., see JP-A2002-1727). In particular, since water-soluble resin has good affinity to water, its drying time is further longer.

Hot air could not be applied to powder and pellets of low-melting-point resin since it melts and fuses the resin. In such a case, the resin must be dried according to a specific method of, for example, keeping it in an absolute dry condition in which its dew point is −80° C. or lower, for from a few days to a few weeks.

The present invention has been made in consideration of the above, and it is to provide a method of easily and efficiently drying a nonionic alkylene oxide-type water-soluble resin so as to make it have a reduced water content within a short period of time, and to provide a nonionic alkylene oxide-type water-soluble resin dried according to the method. Another object of the invention is to provide a drying method capable of being attained even at low temperatures and applicable to a nonionic alkylene oxide-type water-soluble resin having a low melting point, and to provide a nonionic alkylene oxide-type water-soluble resin dried according to the method.

For the dried resin, it is an important theme to keep its dry condition.

For packaging the dried nonionic alkylene oxide-type water-soluble resin with its low water content kept as such, generally employed is a method of substituting gas inside a packaging container.

For gas substitution, for example, there is a method of providing a room (substitution chamber) filled with an inert gas and attaining the intended gas substitution in the chamber. Another method is known, which comprises forming a nozzle hole in the temporarily adhered cap of a container, introducing an inert gas into the container through it, and sealing up the hole after the nozzle has been removed (JP-A 8-192821).

In the former method where the gas substitution is attained in the gas substitution chamber, an empty container may be previously put in the gas substitution chamber, then air is sucked away from the substitution chamber so that the chamber is kept in vacuum, and thereafter an inert gas maybe introduced into the chamber for gas substitution therein, whereby the empty container may also undergo the same gas substitution. In the method, however, every time when the gas-substituted empty container is taken out and another empty gas to undergo gas substitution is newly put into the gas substitution chamber, the entire gas substitution chamber must be treated for gas removal from it to be in vacuum followed by inert gas introduction into it, but this is uneconomical. In addition, the treatment requires complicated equipment and the equipment cost increases.

In the latter method where an inert gas is introduced into an empty container through its body or through its cap for gas substitution in the container, the container is limited to a box. In this, in addition, a specific mouth for gas introduction nozzle insertion is necessary, and the shape of the container is limited. Accordingly, the method is problematic in that it could not apply to various containers of different shapes.

Apart from the above-mentioned gas substitution method, there is also known a method of adding an oxygen scavenger and/or a moisture remover to the filler to a container or fixing it on the inner side of an container so that it may adsorb and fix water and oxygen in the container. In this method, however, the product in the container may be contaminated with the oxygen scavenger and/or the moisture remover as an impurity, and when the container is opened to use the product therein, close attention must be paid to it.

The invention has been made in consideration of the above, and it is to provide a method of packaging a nonionic alkylene oxide-type water-soluble resin in a low water content condition, not troubled by the problems mentioned above, and to provide a packaging material for it.

Another object of the invention is to provide a method of transporting a nonionic alkylene oxide-type water-soluble resin.

When a material resin is used for some purposes or when it is imported or exported or commercially sold, it is frequently transported by some transportation systems. The transportation systems and methods may often have significant influences on the quality of the material resin being transported.

In particular, nonionic alkylene oxide-type water-soluble resin is a resin having an ether bond in the backbone chain thereof, and its characteristic is that its chemical structure is extremely weak to heat. Therefore, when the resin is transported by ship, it is exposed to high temperatures including its store tanks during the transportation process and the shipping characteristic has a significant influence on the resin being shipped, or that is, it produces a problem in that the dried and powdered material resin is fused while being transported by ship, and the processability of the transported resin becomes extremely bad.

To solve the problem, the dried and powdered resin material is once dissolved in a solvent, and the resulting solution is transported. However, this is problematic in that the resin solution will have to be again dried and powdered after its transportation in some cases, and, in addition, for reducing the viscosity of the resin solution, a relatively large amount of the solvent corresponding to it will be necessary in order that a relatively stable solution condition of the resin could be ensured. Accordingly, there may be a probability that some legal controls in point of handling of powerful chemicals, explosives and combustibles must be imposed on the transportation of the resin solution. Naturally, since the resin is once formed into its solution, the method requires a prolonged working time and causes the increase in the production costs.

In any method mentioned above, in general, a packaged material resin is dealt with when it is actually loaded on or unloaded from a transportation system. However, when an overall volume of the resin material for transportation increases, then there occurs still another problem in that the loading and unloading operation takes an extremely great deal of labor and time.

Accordingly, still another object of the invention is to provide a method for transporting a nonionic alkylene oxide-type water-soluble resin, of which the advantages are that the excellent handlability of the resin is kept as such, not detracting from the quality of the resin, the transportation is conveniently and safely attained, the working time is shortened, the transportation cost is reduced and the labor for transportation is also reduced.

SUMMARY OF THE INVENTION

The invention provides a method for drying a nonionic alkylene oxide-type water-soluble resin, which comprises putting a nonionic alkylene oxide-type water-soluble resin into a container, degassing the container to a vacuum degree of at most 150 mmHg inside the container, and, with the vacuum degree in the container kept as such, introducing a dry gas having a dew point not higher than the dew point DP calculated according to the following formula (1), into the container at an introduction rate not lower than the introduction rate V calculated according to the following formula (2):

$$DP(°C.) = -21.6 \log_{10} Vac \quad (1),$$

$$V(L/\min) = 0.5 \times [Vac/(273+T)] \times V_0 \quad (2),$$

wherein Vac, T and $V_0$ have the following meanings:
Vac indicates the vacuum degree (mm Hg),
T indicates the temperature inside the container (° C.),
$V_0$ indicates the volume of the container (L).

The drying method of the invention is preferred for drying powder or pellets of a nonionic alkylene oxide-type water-soluble resin which is as follows: The resin contains at least 50% by weight of alkylene oxide structure units, the alkylene oxide structure units contain at least 60% by weight of ethylene oxide structure units, and the resin has a melting point of not higher than 90° C., a glass transition point of from $-100$ to $-30°$ C., a crystallization temperature of not higher than 50° C. and a weight-average molecular weight of from 20,000 to 500,000.

According to the drying method of the invention, a nonionic alkylene oxide-type water-soluble resin having a high water content may be dried to have a water content of at most 100 ppm with a short period of time. Accordingly, the invention is especially favorable for drying powder or pellets of a nonionic alkylene oxide-type water-soluble resin having a low melting point for electrochemical applications.

A second drying method of the invention is for drying a nonionic alkylene oxide-type water-soluble resin that contains minor volatiles, and the method comprises drying the resin by the use of a device that comprises an evaporation tank where the resin is put in and a stirring blade which revolves inside the evaporation tank as it rotates on its own axis.

In the drying method, it is desirable that the evaporation tank is degassed and a dry gas having a dew point of not higher than $-40°$ C. is introduced into the evaporation tank from its bottom as a carrier gas therein. More preferably, the temperature of the carrier gas is controlled to fall within a range of the crystallization temperature of the resin to be dried (hereinafter this is indicated by Tc)$\pm 10°$ C. The resin may be prevented from being fused or deteriorated by stirring it in a mode of low-speed stirring or intermittent stirring.

In the drying method, the necessary drying time may be estimated according to the following formula (3):

$$\text{Necessary Drying Time } T(\min) = [(a-b) \times c/(a \times d \times e)] \quad (3)$$

In formula (3), a indicates the initial volatile concentration (ppm); b indicates the intended volatile concentration (ppm); c indicates the amount of the resin fed into the system (kg); d indicates a drying coefficient (kg/L); e indicates the amount of the gas introduced into the system (L/min). The drying coefficient d is represented by the following formula:

Drying Coefficient $d$(kg/L)=[(volatile concentration before drying−volatile concentration after drying)×amount of resin fed into the system]/ (time×volatile concentration before drying× amount of gas introduced into the system), in which the unit of each numerical value is as follows:

Volatile concentration: ppm,
Amount of resin fed into the system: kg,
Time: min,
Amount of gas introduced into the system: L/min.

According to the second drying method as above, the resin can be efficiently dried and even minor moisture can be removed from the resin by the use of a relatively simple apparatus. Since the operation is effected in a reduced-pressure system, minor solvent may be removed from the resin at low temperature, and the resin being processed can be prevented from being thermally deteriorated. In addition, since dry gas is fed into the system through its bottom, the minor solvent gas component that may stay in the system can be efficiently discharged out. Further, since the carrier gas temperature is controlled to fall within a range of $(Tc \pm 10)°$ C., the resin can be efficiently dried, and the resin can be prevented from being softened. Moreover, since the system is stirred in a mode of low-speed stirring or intermittent stirring, the resin may be protected from troubles of fusion or mechanical deterioration to be caused by heat generation in continuous stirring. Further, since the necessary time within which the minor solvent component is reduced to a desired level can be estimated, the end control of the removal operation is easy.

The nonionic alkylene oxide-type water-soluble resin, especially EO-BO copolymer resin obtained according to the drying method of the invention has good physical properties and good electrochemical properties, and may be therefore useful for a material of electrochemical devices.

The invention also provides a method for packaging a dried nonionic alkylene oxide-type water-soluble resin with protecting the resin from water. To solve the above-mentioned problems, the packaging method of the invention comprises introducing a dry gas into a packing line that runs from a dry resin-feeding zone to a packaging container, thereby introducing the dry gas into the empty packaging container just before packed with the resin along with purging away the air initially existing in the container, then packing the packaging container with the resin, and sealing up the opening of the packaging container.

Preferably in the packaging method, the dry gas is kept introduced into the packaging container after packed with the resin. Preferably, the packaging container is an aluminium-laminated bag having a resin-coated inner face.

Not requiring any large-scaled substitution chamber, the packaging method of the invention makes it possible to protect the resin from water merely by the use of a simple device. Accordingly, the method enables continuous packaging through a sieve. In addition, since the packaging container is not limited in point of its shape, various types of packaging modes may be employed for the method. Further, since the method does not require a moisture remover or the like, it is free from a trouble of product contamination with the additive as an impurity. Moreover, when an aluminium-laminated bag having a resin-coated inner face is used as a packaging container, then even the resin having an ultra-low water content can be stored therein for a long period of time.

The invention also provides a method for transporting a nonionic alkylene oxide-type water-soluble resin. Specifically, we, the inventors have noted the physical properties of the resin, and investigated a method for transporting the resin and also a method for loading and unloading the resin in and out of a transportation system for the method. As a result, we have found that, when a nonionic alkylene oxide-type water-soluble resin to be transported is controlled so as to have a predetermined solvent concentration and have a viscosity that satisfies a predetermined standard and when the resin is transferred into a transportation container capable of being controlled at a predetermined temperature and then transported while it is in the container, and further when the operation of loading the resin into the container and unloading it from the container is attained by the use of a pump, then the specific transportation method can solve the above-mentioned problems.

Specifically, the method of transporting a nonionic alkylene oxide-type water-soluble resin of the invention comprises controlling the resin so as to have a solvent content of from 0.001 to 50% by weight and a viscosity at 40° C. of at most $100,000 \times 0.1$ Pa·sec, and loading it into a transportation container equipped with a temperature control capability and/or unloading it out of the transportation container by the use of a pump.

According to the invention, therefore, there is provided a method for transporting a nonionic alkylene oxide-type water-soluble resin, of which the advantages are that the method ensures the excellent handlability of the resin not detracting from the quality of the resin, the transportation is conveniently and safely attained, the working time is shortened, the transportation cost is reduced, and the labor for transportation is also reduced.

Figure 1:
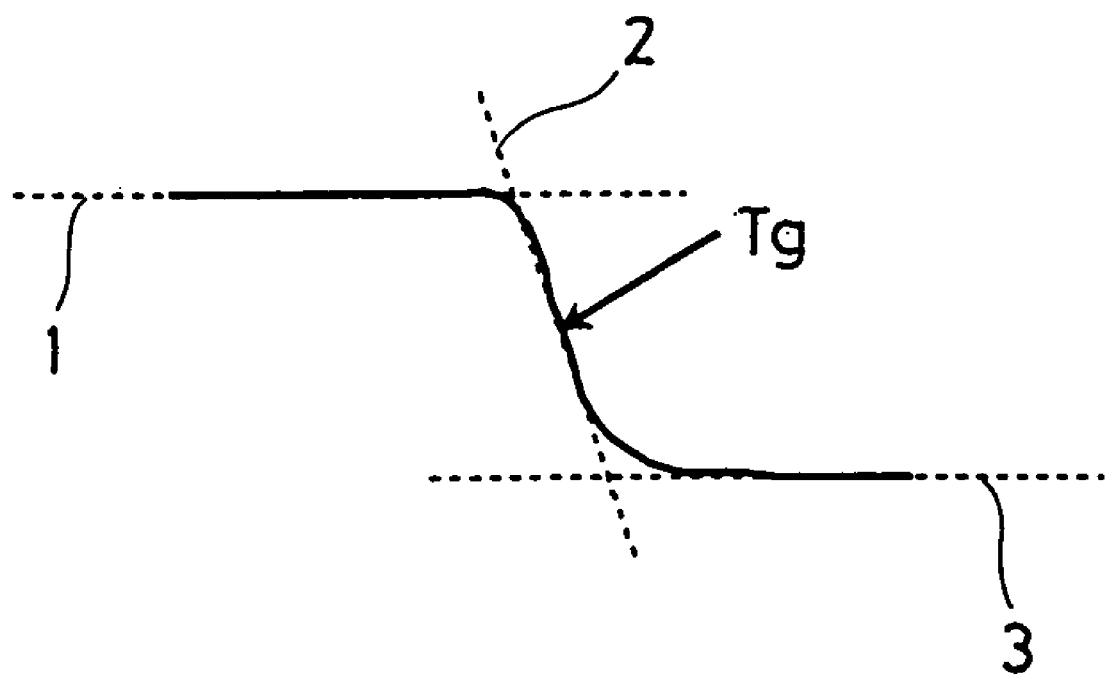
FIG. 1 is a view showing a way to draw base line extrapolation curves 1 and 3 and an extrapolation curve 2 at an inflection point at around Tg in an exothermic/endothermic curve.

In these drawings, 1 to 3 are extrapolation curves; 4 is a drying container; 5 is a stainless metal gauze; 10 is an evaporation tank; 11 is a resin inlet mouth; 12 is a resin take-out mouth; 20 is a stirring device, 21 is a rotation shaft; 22 is an arm; 23 is a stirring blade; 30 is a jacket; 40 is a carrier gas supply source; 41 is a carrier gas inlet duct; 50 is a resin supply source; 61 is a resin supply part; 62 is a packing line; 63 and 64 are dry gas supply ducts; 65, 66 and 67 are valves; 68 is a filter; 70 is a packaging container.

DESCRIPTION OF THE PREFERRED EMBODIMENTS

The method for drying a nonionic alkylene oxide-type water-soluble resin, the method for packaging it and the method for transporting it of the invention are described in detail hereinunder. However, the following description is not whatsoever intended to restrict the scope of the invention, and various changes and modifications can be made therein without departing from the spirit and scope of the invention.

Not specifically defined, the nonionic alkylene oxide-type water-soluble resin (nonionic alkylene oxide-type water-soluble copolymer) to which the invention is directed may be any one that essentially contains alkylene oxide monomer-derived constitutive components (structure units) in the molecular structure thereof and has an ether bond in the backbone chain thereof. Concretely, for example, the resin is preferably a copolymer prepared through polymerization of starting monomers, an ethylene oxide and a comonomer group that contains a substituted oxirane compound of the following structural formula (I):

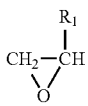

(I)

wherein $R_1$ represents Ra (Ra is any of an alkyl, cycloalkyl, aryl, aralkyl, (meth)acryloyl or alkenyl group having from 1 to 16 carbon atoms), or —$CH_2$—O—Re—Ra (Re is a substituent having a structure of —($CH_2$—$CH_2$—O)p- in which p is an integer of from 0 to 10).

Preferably, the polymerization is in a mode of ring-cleavage polymerization at the oxirane group of the starting monomers.

$R_1$ in the structural formula (I) is a substituent in the substituted oxirane compound.

The substituted oxirane compound for the starting monomer maybe one type alone or two or more different types of substituted oxirane compounds that may be represented by the structural formula (I).

The substituted oxirane compounds of formula (I) include, for example, propylene oxide, butylene oxide, 1,2-epoxypentane, 1,2-epoxyhexane, 1,2-epoxyoctane, cyclohexene oxide and styrene oxide, as well as methyl glycidyl ether, ethyl glycidyl ether and ethylene glycol methyl glycidyl ether. When the substituent $R_1$ is a crosslinkable substituent, or that is, when the substituent $R_1$ has any of an aryl group, an alkenyl group, an acryloyl group and a methacryloyl group, the compounds of the type include epoxybutene, 3,4-epoxy-1-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate and glycidyl 4-hexanoate, as well as vinyl glycidyl ether, allyl glycidyl ether, 4-vinylcyclohexyl glycidyl ether, α-terpenyl glycidyl ether, cyclohexenylmethyl glycidyl ether, 4-vinylbenzyl glycidyl ether and 4-allylbenzyl glycidyl ether. As so mentioned hereinabove, one or more different types of these compounds may be used herein either singly or as combined.

Preferably, the substituted oxirane compound having a crosslinkable substituent (in which the substituent $R_1$ is a crosslinkable substituent) is indispensably used in the invention for the purpose of using the nonionic alkylene oxide-type water-soluble resin as a crosslinked derivative thereof.

Not specifically defined, the weight-average molecular weight (Mw) of the nonionic alkylene oxide-type water-soluble resin is preferably from 20,000 to 500,000, more preferably from 30,000 to 200,000, even more preferably from 40,000 to 150,000. If the weight-average molecular weight thereof is smaller than 20,000, then the shaped article of the resin may be tacky; but if larger than 500,000, then the resin will be difficult to shape and its workability and handlability may be poor.

Also not specifically defined, the molecular weight distribution (Mw/Mn) of the nonionic alkylene oxide-type water-soluble resin is preferably at most 3, more preferably at most 2. If the molecular weight distribution thereof is larger than 3, then the shaped article of the resin may be tacky and the handlability of the resin may be poor.

Also not specifically defined, the method of polymerization for obtaining the nonionic alkylene oxide-type water-soluble resin for the invention may be, for example, solution polymerization or precipitation polymerization that uses a solvent. In particular, solution polymerization is preferred in the invention as its producibility is good. More preferred in the invention is a method of solution polymerization in which monomers are fed into a solvent previously in a reactor, and polymerized therein, in view of the safety of the method in that the reaction heat may be readily released out of the system.

The solvent is preferably an organic solvent not containing an active hydrogen such as hydroxyl group, and it includes, for example, aromatic hydrocarbon solvents such as benzene, toluene, xylene, ethylbenzene; aliphatic hydrocarbon solvents such as heptane, octane, n-hexane, n-pentane, 2,2,4-trimethylpentane; alicyclic hydrocarbon solvents such as cyclohexane, methylcyclohexane; ether solvents such as diethyl ether, dibutyl ether, methyl butyl ether; ethylene glycol dialkyl ether solvents such as dimethoxyethane; cyclic ether solvents such as THF (tetrahydrofuran), dioxane. Especially preferred are toluene and xylene. More preferably, the organic solvent for use herein does not contain water at all.

The EO-BO copolymer resin as referred to herein means a copolymer prepared through addition-copolymerization of essentially ethylene oxide (EO) and butylene oxide (BO) with a glycidyl ether. Not detracting from the object of the invention, the copolymer may contain any other monomer. The constitutional ratio of ethylene oxide, butylene oxide and glycidyl ether of constituting the copolymer is not specifically defined. For electrochemical applications, the copolymer may generally comprise from 90 to 95% by weight of ethylene oxide, from 3 to 10% by weight of butylene oxide, and from 0 to 5% by weight of glycidyl ether. The molecular weight (this is weight-average molecular weight, and the same shall apply hereinunder) of the resin may be from 20,000 to 500,000 or so, preferably from 20,000 to 200,000 or so. The morphology of the resin is not specifically defined. In general, the resin may be in the form of pellets or powder, but may also be granular or ground. For making the resin have various forms of pellets or powder, any conventional method may be suitably employed.

1. Method of Drying Nonionic Alkylene Oxide-type Water-Soluble Resin:

According to the drying method of the invention, powder or pellets of a nonionic alkylene oxide-type water-soluble resin are fed into a drying container, and a dry gas is introduced into the container under reduced pressure.

The drying container may be any one capable of being airtightly closed and resistant to reduced pressure, and is not specifically defined in point of the shape and the material thereof. Preferably, however, the container is so designed that it may be degassed through its top and a dry gas may be introduced into it through its bottom. Though not specifically needed, a temperature control unit maybe fitted to the container. Also though not specifically needed, a stirring mechanism may also be fitted thereto.

Preferably, the vacuum degree in the container is at most 150 mmHg, more preferably at most 100 mmHg. The temperature inside the container may be room temperature, but when the container is heated, its temperature must not be higher than the melting point of the resin to be dried therein.

The type of the dry gas is not specifically defined, and any one not reactive with the resin is employable herein. For example, it includes air, nitrogen, helium, argon, carbon dioxide. In view of the cost thereof, air and nitrogen are preferred.

Regarding the degree of dryness of the dry gas, it is desirable that the dew point of the dry gas is not higher than a temperature DP calculated according to the above-mentioned formula (1). More preferably, the dry gas has a dew point not higher than −40° C. The amount of the dry gas to be introduced into the drying container is preferably not smaller than the value V calculated from the volume (strictly the empty volume) of the drying container according to the above-mentioned formula (2).

Not specifically defined, the, nonionic alkylene oxide-type water-soluble resin to which the drying method of the invention is applied preferably has a solubility in water of at least 10 g/100 g of water, and the invention is especially useful when applied to the resin of the type.

For example, a nonionic alkylene oxide-type water-soluble resin that contains at least 50% by weight of alkylene oxide structure units in which the alkylene oxide structure units contain at least 60% by weight of ethylene oxide structure units, and has a glass transition point of from −100 to −30° C., a crystallization temperature of not higher than 50° C. and a weight-average molecular weight of from 20,000 to 500,000, preferably from 20,000 to 200,000 has a possibility that it exhibits excellent properties when used in electrochemical applications, but the water content of the resin of the type has close relation with the physical properties and the electrical properties of the resin. Therefore, it is an important theme to reduce the water content of the resin. However, many of the resin group have a low melting point, and they could not be dried in an ordinary drying method with hot air. According to the drying method of the invention, the resin can be dried so as to have an extremely reduced water content, not requiring heating. Therefore, the invention has brought about a new probability that resins having a low melting point of not higher than 90° C. can be employed in electrochemical applications.

Examples of the invention are described below, which, however, are not intended to restrict the scope of the invention.

PRODUCTION EXAMPLE 1-1

3 kg of dewatered toluene and 0.5 g of a catalyst sodium methylate were fed into a 10-liter pressure reactor equipped with a stirring blade, heated up to 90° C., and then controlled to have a pressure of at most 200 kPa and a temperature of at most 120° C. Resin materials of ethylene oxide, 1,2-butylene oxide and allyl glycidyl ether in a ratio of 90/7/3 (by weight) to reach 2 kg in total were successively added to the reactor and reacted therein to give a copolymer solution. Thus obtained, the copolymer solution was put into hexane, in which the resin component was deposited and recovered. This is resin 1 (powder).

PRODUCTION EXAMPLE 1-2

A copolymer solution was prepared in the same manner as in Production Example 1-1, for which, however, resin materials of ethylene oxide and 1,2-butylene oxide in a ratio of 90/10 were added to the reactor. Toluene was removed from the resulting copolymer solution through an evaporator, and a molten resin was shaped into a sheet, which was then pelletized into pellets having a size of a few mm or so. This is resin 2 (pellets)

PRODUCTION EXAMPLE 1-3

Resin 3 (pellets) was prepared in the same manner as in Production Example 1-2, for which, however, resin materials of ethylene oxide and 1,2-butylene oxide in a ratio of 80/20 were added to the reactor.

The physical properties of the resins prepared in the above-mentioned Production Examples are shown in Table 1.

TABLE 1

| Resin | Ethylene Oxide Content | Weight-Average Molecular Weight | Melting Point | Glass Transition Point | Crystallization Temperature |
|---|---|---|---|---|---|
| Resin 1 | 90.5 wt. pts. | 110,000 | 42° C. | −56° C. | 20° C. |
| Resin 2 | 88.5 wt. pts. | 100,000 | 35° C. | −60° C. | 25° C. |
| Resin 3 | 81.2 wt. pts. | 80,000 | 22° C. | −62° C. | 12° C. |

In Table 1, the crystallization temperature, the melting point and the glass transition point were determined through differential scanning calorimetry (DSC), and the weight-average molecular weight was determined through GPC analysis.

The condition for DSC is as follows, and the process is entirely in a nitrogen atmosphere.

(1) The sample is heated from room temperature up to 100° C. at a heating rate of 10° C./min, and kept at 100° C. for 1 minute.

(2) Then, this is cooled from 100° C. to −100° C. at a cooling rate of 5° C./min, and the temperature at the exothermic peak during this is read. This is the crystallization temperature of the sample.

(3) This is kept at −100° C. for 2 minutes, and again heated from −100° C. up to 100° C. at a heating rate of 5° C./min, and the temperature at the endothermic peak during this is read. This is the melting point of the sample.

In addition, the glass transition point (Tg) of the sample is determined during the heating cycle of the above (3). Specifically, in the exothermic/endothermic curve at around Tg in the heating cycle, base line extrapolation liens 1 and 3 and an extrapolation line 2 at an inflection point are drawn as in FIG. 1, and Tg is derived from these.

The condition for GPC is as follows:
Column: Guard column PWXL+G5000PWXL+ G4000PWXL+G3000PWXL+G2500PWXL (all by Tosoh).
Column size: 7.8 mmϕ×30 cm.
Column temperature: 40° C.
Eluent: acetonitrile/0.08M-sodium acetate solution=50/50 (by volume).
Flow rate: 1.0 ml/min.
Detector: differential refraction detector.
Standard substance: Tosoh's polyethylene oxide, having a molecular weight of from 20,000 to 900,000.

EXAMPLE 1-1

Figure 2:
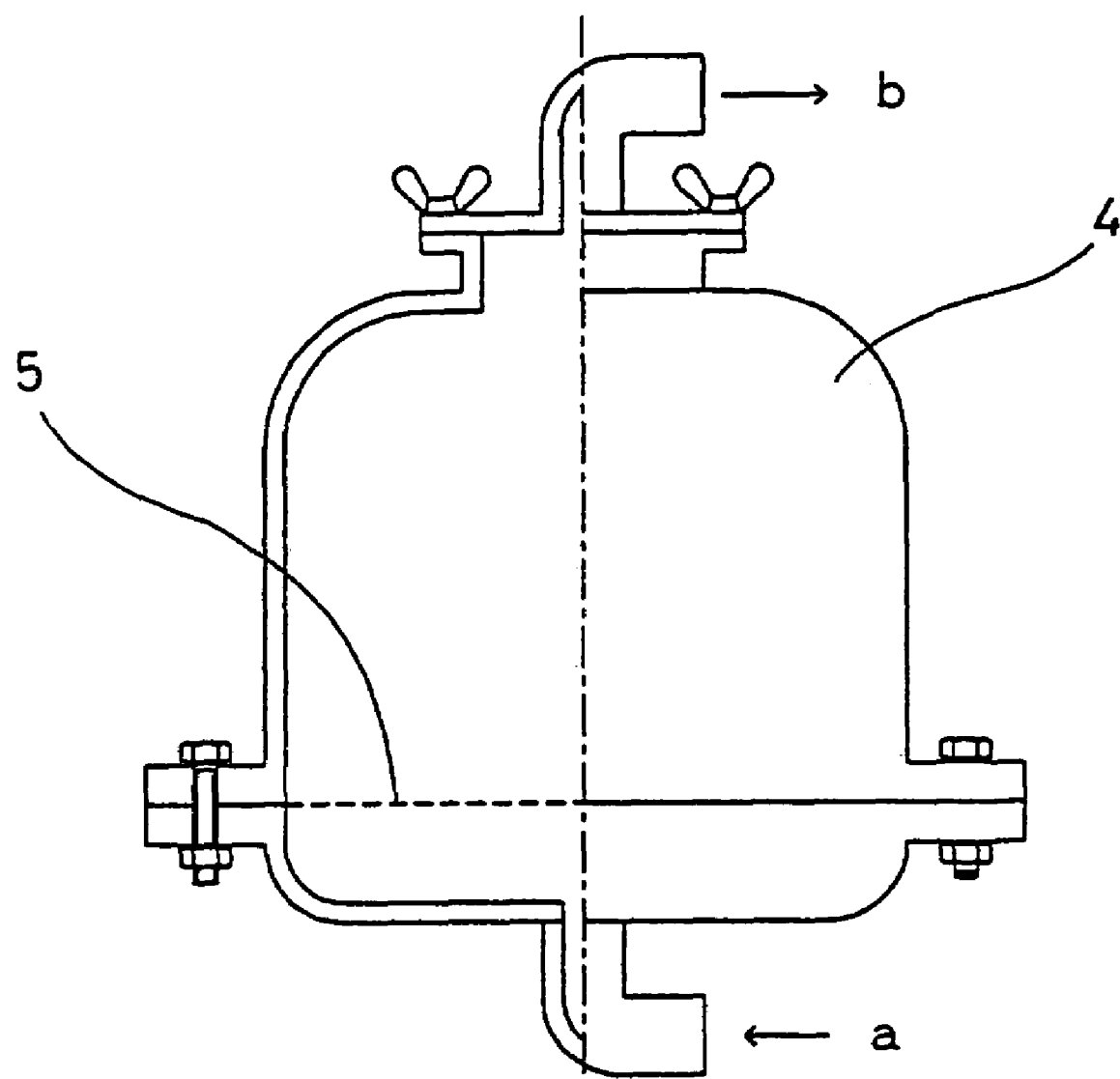
FIG. 2 is a partly-cut schematic cross-sectional view showing a structure of a drying container used in Example of the invention.

The resin obtained in the above was dried by the use of a drying container 4 having a structure shown in FIG. 2. The volume of the drying container is 3 liters. In FIG. 2, 5 indicates a stainless metal gauze. The resin is dried on the stainless metal gauze 5. At the bottom of the container, a dry gas is introduced into the container in the direction of the arrow a; and at the top thereof, the container is degassed by means of a vacuum pump in the direction of the arrow b, whereby the pressure in the container is reduced.

1000 g of the resin 1 obtained in Production Example 1-1 was put into the container, and this was put into a thermostatic chamber and controlled at 30° C. therein. The container was degassed by means of a vacuum pump, and, while it was kept at a reduced pressure of 30 mmHg, nitrogen gas having a dew point of −70° C. was introduced into it at a rate of 2.0 L/min so as to dry the resin powder.

Before the start of the drying, and 3 hours, 5 hours and 8 hours after the start of the drying, the water content of the resin was determined according to a Karl Fisher's method. Concretely, the resin was dissolved in dewatered toluene to be a solution thereof having a solid concentration of 10% by weight, and its water content was determined by the use of a Hiranuma's trace water meter (AQ-2000, by Hiranuma Sangyo). Thus measured, the data were corrected relative to the water content of the dewatered toluene that had been determined separately. The results are given in Table 3.

EXAMPLES 1-2, 1-3; COMPARATIVE EXAMPLES 1-1 to 1-3

In the same manner as in Example 1-1, other resins were dried and their water content was determined. The type and the amount of the resin, and the drying condition are shown in Table 2. The results are given in Table 3.

TABLE 2

| | Resin | Amount of Resin | Temperature of Container | Vacuum Degree | Drying Gas | Dew Point | Amount of Drying Gas |
|---|---|---|---|---|---|---|---|
| Example 1-1 | resin 1 | 1000 g | 30° C. | 30 mmHg | nitrogen | −70° C. | 2.0 L/min |
| Example 1-2 | resin 2 | 1000 g | 10° C. | 5 mmHg | air | −50° C. | 3.0 L/min |
| Example 1-3 | resin 3 | 800 g | 10° C. | 100 mmHg | air | −60° C. | 1.5 L/min |
| Comparative Example 1-1 | resin 1 | 1000 g | 30° C. | 30 mmHg | no | — | — |
| Comparative Example 1-2 | resin 1 | 1000 g | 30° C. | 200 mmHg | nitrogen | −70° C. | 0.2 L/min |
| Comparative Example 1-3 | resin 1 | 1000 g | 30° C. | 200 mmHg | nitrogen | 0° C. | 2.0 L/min |

TABLE 3

| | Water Content (ppm) | | | |
|---|---|---|---|---|
| | before drying | after 3 hours | after 5 hours | after 8 hours |
| Example 1-1 | 9000 | 250 | 80 | 40 |
| Example 1-2 | 12000 | 450 | 95 | 60 |
| Example 1-3 | 8200 | 165 | 70 | 42 |
| Comparative Example 1-1 | 9000 | 3500 | 2300 | 1020 |
| Comparative Example 1-2 | 9000 | 7800 | 6500 | 5600 |
| Comparative Example 1-3 | 9000 | 8100 | 6800 | 6500 |

Table 3 confirms that, according to the drying method of the invention, even nonionic alkylene oxide-type water-soluble resin having a water content of more than 8000 ppm can be dried to have a reduced water content of less than 1000 ppm within a short period of time of 5 hours.

2. Method of Drying Nonionic Alkylene Oxide-type Water-Soluble Resin to Remove Minor Volatiles:

In the drying method of the invention, used is a device that comprises an evaporation tank and a stirring blade that revolves (circles) inside the evaporation tank as it rotates on its own axis. An outline of the device is described with reference to the drawing attached hereto.

Figure 3:
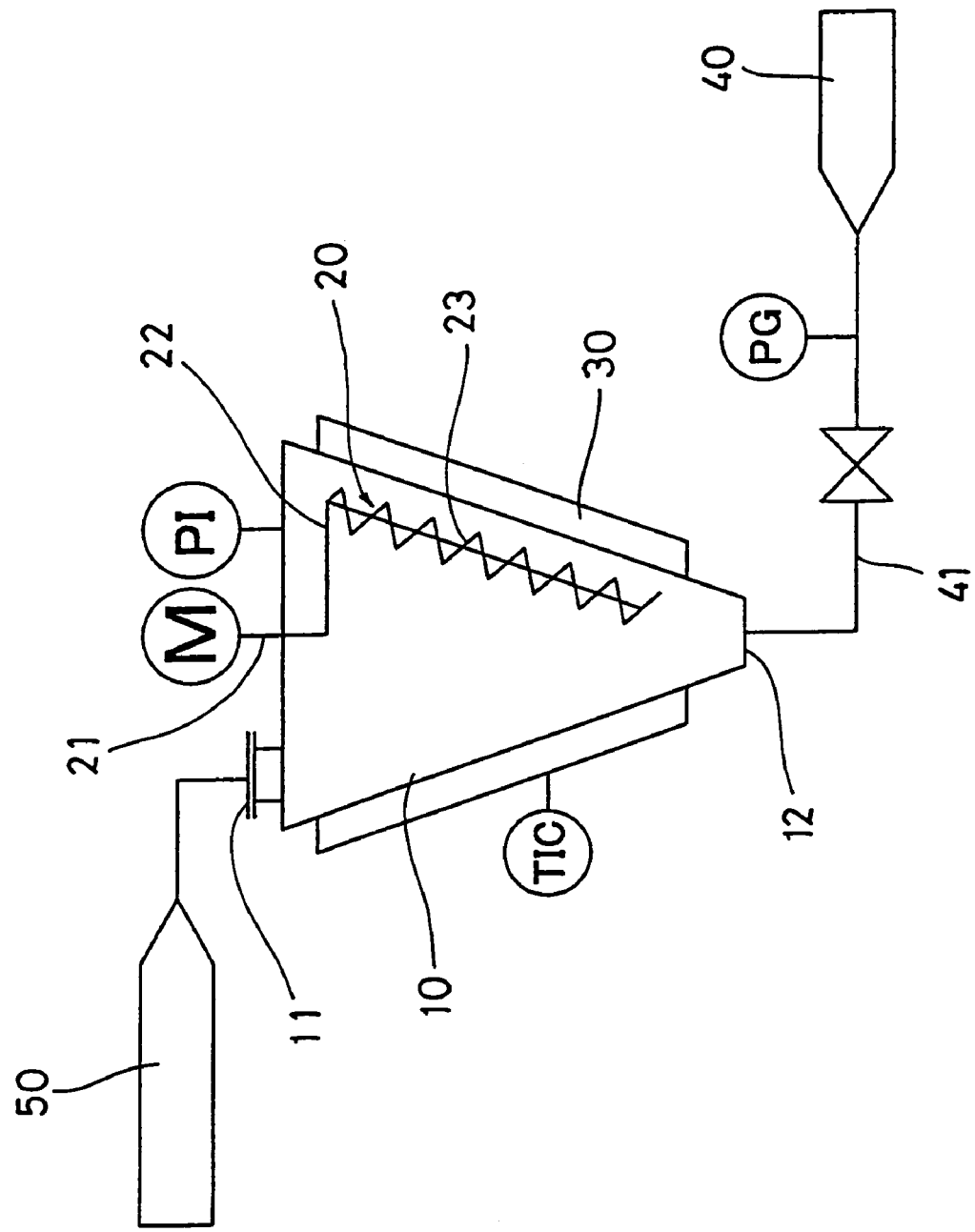
FIG. 3 is a schematic cross-sectional view showing an outline of a drying apparatus used in the invention.

In FIG. 3, 10 is an evaporation tank in which a resin to be dried is put in; 11 is a resin inlet mouth; 12 is a resin take-out mouth; 20 is a stirring device, 21 is a rotation shaft; 22 is an arm; 23 is a stirring blade; 30 is a jacket filled with a heat carrier; 40 is a carrier gas supply source such as a gas cylinder; 41 is a carrier gas inlet duct; 50 is a resin supply source such as a pellets-housing chamber.

The stirring device 20 is provided with an arm 22 perpendicularly fitted to the rotation shaft 21, and a screw-type stirring blade 23 is fitted to the chip of the arm 22, making an acute angle with the arm 22. Following the arm 22, the stirring blade 23 revolves (circles) inside the evaporation tank 10 along the wall face of the tank, as it rotates (self-rotates) on its own axis. The stirring motion makes it possible to well stir the resin in the evaporation tank, and efficient drying is therefore possible. In the device of FIG. 3, the evaporation tank is almost conical, and the stirring blade 23 is inclined along the inclination of the wall face of the tank. However, the shape of the device is not limited to the illustrated one. For example, the evaporation tank may be almost cylindrical. In such a case, it is desirable that the stirring blade is fitted perpendicularly to the arm along the wall face of the tank.

When a resin is dried by the use of the device as above, then it is desirable that the evaporation tank is degassed to have a reduced pressure of from 5 to 40 kPa or so, and optionally cooled so that the temperature inside the tank (product temperature therein) could be kept not higher than Tc of the resin, and a carrier gas is introduced into the tank in that condition.

In such a reduced-pressure operation, the minor solvent component may be removed from the resin even at a low product temperature, and therefore the resin is protected from thermal deterioration. In addition, since the resin temperature is kept not higher than Tc of the resin, the resin may be prevented from being softened.

The carrier gas to be introduced into the system is preferably a dry gas having a dew point not higher than −40° C., more preferably not higher than −60° C. Regarding its type, the dry gas is not specifically defined and may be any one not reactive with the resin to be processed. For example, it includes air, nitrogen, helium, argon and carbon dioxide.

In view of their cost, preferred are air and nitrogen. Such a dry gas is introduced into the evaporation tank from its bottom to its top, whereby the minor solvent gas component remaining in the system may be extracted into the dry gas and may be efficiently purged out of the system. The flow rate of the carrier gas preferably falls between 0.1 and 3.0 in terms of the ratio of the gas amount to the resin amount (gas amount (L/min)/resin amount (kg)).

When the room temperature is low, then the carrier gas may be heated and introduced into the system, whereby the resin may be efficiently dried. Preferably, the temperature is not lower than (Tc−10)° C., more preferably not lower than Tc. However, for preventing the resin from being softened, the temperature is preferably not higher than (Tc+10)° C.

For preventing the resin from being softened and fused and from being mechanically or thermally deteriorated, a low-speed stirring mode or a intermittent driving mode may be employed. For the low-speed stirring mode, for example, the self-rotation speed is preferably from 10 to 50 rpm, and the revolution speed is preferably from 1.0 to 3.0 rpm. The intermittent driving mode is for alternately driving and stopping the system. The drive time maybe from 5 to 15 minutes or so, and the rest time may be from 10 to 60 times or so.

When the carrier gas flow rate and the drying temperature are defined, then the drying coefficient d is experimentally obtained from them. Even when the initial volatile concentration (ppm) in the resin before drying and the resin amount (kg) fed into the system are varied, the time to be taken for volatile removal may be estimated according to the above-mentioned presumptive formula (3). Accordingly, the end point control for the removal operation is easy. However, the drying coefficient d is valid when the ratio of the gas amount to the resin amount (gas amount (L/min)/resin amount (kg)) falls in a range between 0.1 and 3.0.

When the volatile concentration after the drying is lower than the intended volatile concentration, then a suitable amount of a solvent may be added to the dried resin so as to make the resin have a volatile concentration falling within the intended range. Regarding the solvent addition to the resin, it is desirable that the solvent is sprayed through a spraying nozzle into the evaporation tank for making the volatile concentration uniform in the resulting resin and in view of the addition efficiency. Preferably, the nozzle is so disposed that it may revolve along the revolution axis and may jet out the solvent in front of the traveling direction (revolving direction) of the stirring blade. For controlling the amount of the solvent to be added to the system, a necessary amount of the solvent is once metered and put in a chamber, and then it may be led into the evaporation tank; or while the flow rate of the solvent from a supply source (e.g., tap water source) is controlled via a flow rate meter and the solvent may be directly led into the evaporation tank. Preferably, the solvent addition rate falls between 10 and 150 weight ppm/min relative to the resin. If it is lower than 10 weight ppm/min, then the efficiency is low; but if higher than 150 weight ppm/min, then the resin may dissolve or expand or aggregate. The method described herein is applicable to volatile concentration control in a case where the initial volatile concentration in the resin is lower than the intended volatile concentration in the processed resin. When the solvent is water, then the volatile concentration control (moisturization) may be attained by introducing a wet gas (e.g., air) into the evaporation tank.

Examples of the invention are described below, to which, however, the invention should not be limited.

In the following Examples and Comparative Examples, the water content of the pellets was determined according to the same Karl Fisher's method as in-the above-mentioned Examples. The crystallization temperature (Tc) was measured through differential scanning calorimetry (DSC); and the molecular weight was determined through GPC under the same condition as in the above-mentioned Examples.

The differential scanning calorimetry was carried out by the use of Seiko Instruments' DSC220C. The condition is as follows: In a nitrogen atmosphere, the sample is heated from room temperature up to 100° C. at a heating rate of 10° C./min, then kept at 100° C. for 1 minute, and thereafter cooled from 100° C. to −20° C. at a cooling rate of 5° C./min. The temperature at the exothermic peak during this cycle is read. This is the crystallization temperature of the sample.

PRODUCTION EXAMPLE 2-1

150 kg of dewatered toluene was put into a pressure reactor equipped with a stirrer, and 27 g of a catalyst sodium methylate was added thereto and heated up to 100° C. With controlling the reactor to have a pressure of not higher than 200 kPa and a temperature of not higher than 120° C., ethylene oxide, 1,2-butylene oxide and allyl glycidyl ether in a ratio of 90/7/3 (by weight) to reach 100 kg in total were successively added to the reactor, and a resin (polymer) solution was thus obtained.

EXAMPLE 2-1

The solvent was removed from the polymer solution that had been prepared in Production Example 2-1, and shaped into a sheet, and then this was pelletized. The polymer herein obtained is in the form of pellets, and its Tc was 22° C. and its molecular weight was 100,000.

100 kg of the thus-obtained pellets were put into a conical mixing stirrer, SV Mixer 200L. With cold water led through the jacket of the SV mixer, the mixer tank was kept at 20° C. Then, the tank was degassed to a reduced pressure of 12 kPa, and thereafter nitrogen gas was introduced thereinto at a rate of 300 L/min. The mixer was stirred in a mode of intermittent driving at a rotation of 0.8 kW and a revolution of 0.2 kW (drive time 10 minutes; rest time 10 minutes).

Based on the drying coefficient $3.67 \times 10^{-3}$, the time taken to reach the intended water content 200 ppm was estimated, and the resin was dried in that condition. The drying coefficient is obtained as follows: 130 kg of the resin pellets are put into a conical mixing stirrer, SV Mixer 200L. With cold water led through the jacket of the SV mixer, the mixer tank is kept at 20° C. Then, the tank is degassed to a reduced pressure, and thereafter nitrogen gas is introduced thereinto at a rate of 300 L/min to dry the resin. From the water concentration in the resin before and after the drying operation, the resin amount fed into the system, the drying time and the gas amount introduced into the system, the drying coefficient is obtained. The water concentration before and after drying, the drying time and the deviation from the aimed value are given in Table 4.

EXAMPLE 2-2

The same pellets as in Example 2-1 were left in air, and they absorbed water and their water content became 7658 ppm.

100 kg of the pellets were put into a conical mixing stirrer, SV Mixer 200L. Under the same condition as in Example 2-1, the time to be taken to reach the intended water content 200 ppm was estimated, and the pellets were dried.

PRODUCTION EXAMPLE 2-2

A polymer solution was obtained under the same condition as in Production Example 2-1, for which, however, the monomer composition (ratio by weight) was varied to EO/BO=92/8.

EXAMPLE 2-3

The solvent was removed from the polymer solution that had been prepared in Production Example 2-2, and shaped into a sheet, and then this was pelletized. The polymer herein obtained is in the form of pellets, and its Tc was 18° C. and its molecular weight was 110,000.

1000 kg of the thus-obtained pellets were put into a conical mixing stirrer (Nauter Mixer DBX-2000RWV, by Hosokawa Micron) 2000 L. With cold water led through the jacket of the Nauter Mixer, the mixer tank was kept at 20° C. Then, the tank was degassed to a reduced pressure, and thereafter nitrogen gas was introduced thereinto at a rate of 300 L/min. The mixer was stirred in a mode of intermittent driving at a rotation of 2.0 kW (21.5 rpm) and a revolution of 0.75 kW (1.8 rpm) (drive time 10 minutes; rest time 10 minutes). Based on the drying coefficient $3.67 \times 10^{-3}$, the time taken to reach the intended water content 200 ppm was estimated, and the resin was dried in that condition.

COMPARATIVE EXAMPLE 2-1

50 kg of the same resin pellets as those prepared in Example 2-1 were put into a conical stirring mixer, SV Mixer 200L. Except for the resin amount fed into the mixer, the time to be taken to reach the intended water content 200 ppm was estimated under the same condition as in Example 2-1, and the resin was dried in that condition.

COMPARATIVE EXAMPLE 2-2

100 kg of the same resin pellets as those prepared in Example 2-3 were put into a conical stirring mixer, SV Mixer 200L. Under the same condition as in Example 2-1 except that the nitrogen gas flow rate was changed to 5 L/min from 300 L/min, the time to be taken to reach the intended water content 200 ppm was estimated, and the resin was dried in that condition.

3. Method for Packaging Nonionic Alkylene Oxide-Type Water-Soluble Resin:

An object of the invention is to package a resin dried to have a reduced water content with the reduced water content of the resin kept as such, and to keep the packaged condition of the resin. Accordingly, the water content of the resin to which the invention is applied is not specifically defined. However, for example, when the water content is at most about 5,000 ppm, then the invention is especially effective.

Figure 4:
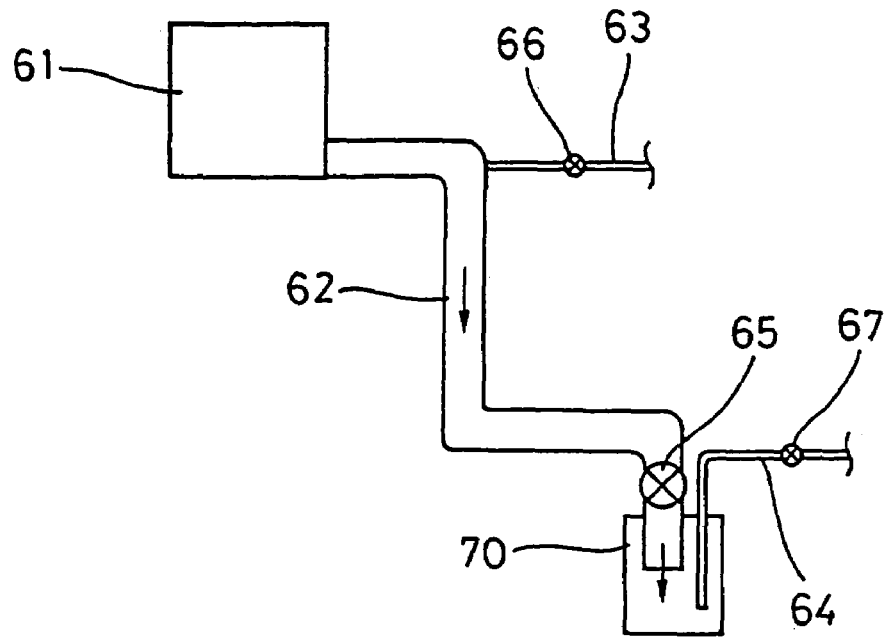
FIG. 4 is a schematic view showing an outline of one embodiment of the packaging method of the invention.
Figure 5:
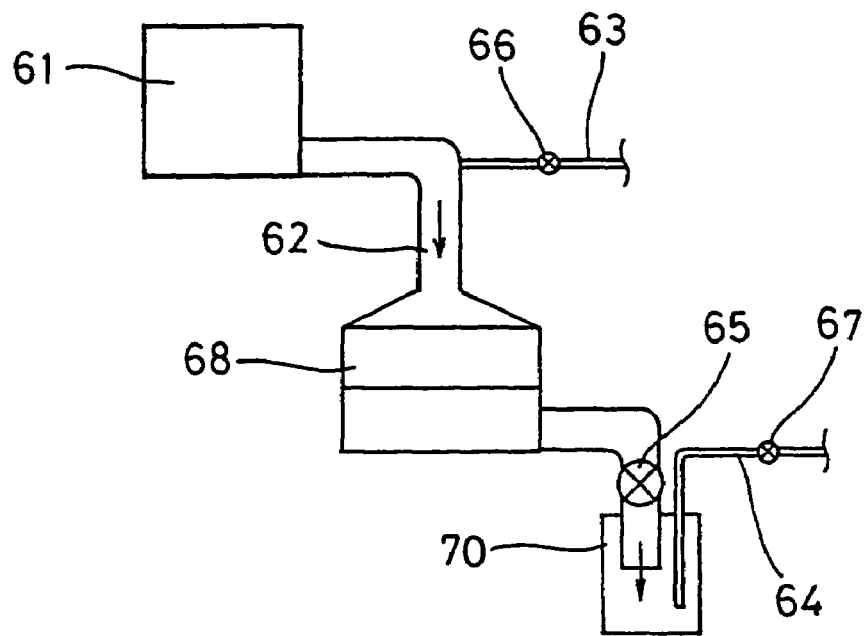
FIG. 5 is a schematic view showing an outline of another embodiment of the packaging-method of the invention.

The invention is described hereinunder with reference to the drawings attached hereto. FIG. 4 is a schematic view showing an outline of one embodiment of the packaging method of the invention. FIG. 5 shows another embodiment of the invention.

In FIGS. 4 and 5, 61 is a resin supply part; 62 is a packing line; 63 and 64 are dry gas supply ducts; 65, 66 and 67 are valves fitted to the ducts; 70 is a packaging container. In FIG. 5, 68 is a filter.

As shown by the arrow in FIG. 4, the resin fed into the system runs form the resin supply part 61 to the packing line 62 and is packed into the packaging container 70. After thus packaged, the opening mouth of the packaging container 70 is sealed up. The packing line 62 is filled with a dry gas supplied thereinto through the dry gas supply duct 63, so that the resin traveling through the system is prevented from being in contact with air. Preferably, a dry gas is fed into the packaging container 70 so that no air may enter the container until the packaging container 70 is sealed up. The members of from the resin supply part 61 to the packaging container 70 and the method of dealing with these are described in detail hereinunder.

The resin supply part 61 indicates any one having the function of supplying a resin dried to have a desired water content, to the system. For example, it is a drying unit. More concretely, it is a powder-mixing tank that may be degassed. A resin is fed into it, and a dry gas is introduced thereinto to thereby substitute moisture or wetted air with it. If desired, the mixing tank may be degassed to have a reduced pressure, and the vapor substitution rate may be increased. Regarding the type thereof, the dry gas may be any one not reactive with the resin to be dried, and is not specifically defined. For example, it includes air, nitrogen, helium, argon and carbon dioxide. Preferred are air and nitrogen in view of their cost.

The packing line 62 from the resin supply part 61 to the packaging container 70 is, for example, tubular, but its shape is not specifically defined. A dry gas is fed into the packing

TABLE 4

| | | Example 2-1 | Example 2-2 | Example 2-3 | Comparative Example 2-1 | Comparative Example 2-2 |
|---|---|---|---|---|---|---|
| Resin Amount (kg) | | 100 | 100 | 1000 | 50 | 100 |
| Nitrogen Amount (L/min) | | 300 | 300 | 300 | 300 | 5 |
| Drying Coefficient ($\times 10^{-3}$ kg/L) | | 3.67 | 3.67 | 3.67 | 3.67 | 3.67 |
| nitrogen amount/resin amount | | 3.00 | 3.00 | 0.30 | 6.00 | 0.05 |
| Water Content of Pellets (ppm) | initial concentration | 3735 | 7658 | 3730 | 4250 | 3625 |
| | final water content | 210 | 188 | 198 | 195 | 3100 |
| | intended water content | 200 | 200 | 200 | 200 | 200 |
| Time (min) | time for removal | 80 | 90 | 900 | 50 | 720 |
| | estimated time | 86 | 88 | 860 | 26 | 5149 |
| Deviation from aimed value (%) | water concentration | 5.0 | −6.0 | −1.0 | −2.5 | — |
| | time | −6.9 | 1.7 | 4.7 | 92.6 | — | line through the dry gas supply duct 63, and preferably, the packing line is filled with the dry air.

Preferably, the gas permeability and the moisture permeability of the packaging container 70 are as small as possible. Regarding the gas permeability of the material of the container, it is desirable that the oxygen penetration degree of the container, as measured according to ASTM D3985, is at most 10 ml/(m$^2$·24 hrs·atm), and the moisture permeation degree thereof, as measured according to ASTM D895, is at most 1 g/(m$^2$·24 hrs). The container may be in any form of box or bag. The bag for the container is more preferably formed of an aluminium foil alone or of an aluminium foil-containing multi-layered film (aluminium-laminated bag). In this case, the thickness of the aluminium foil is at least 3 μm. The film except the aluminium foil to constitute the multi-layered film is not specifically defined. In view of the heat-sealability thereof, however, preferred are resin films such as polyethylene, polypropylene or ethylene-vinyl acetate copolymer films. Further, a base film may be added to the multi-layered film for increasing the mechanical strength of the resulting film. The base film is not also specifically defined. For it, for example, preferred are nylon resin films and polyester resin films in view of the mechanical strength and the cost thereof. Regarding the thickness of the constitutive films except aluminium foil, it is generally desirable that the resin film has a thickness of from about 10 to 200 μm and the base film has a thickness of from about 10 to 100 μm.

When a resin is packed into the packaging container 70, a dry gas is previously introduced via the dry gas supply duct 64 into the empty container 70 to thereby remove the inside air from the container. A bag serving as the container is preferably inflated with a dry gas. For more severely preventing water from entering the packaging container, it is desirable that a dry gas is kept introduced into the container even after the container is filled with a resin.

After the packaging container 70 is filled with a predetermined amount of a resin, the opening mouth of the container 64 is sealed up. For sealing up it, any ordinary method heretofore known in the art may be employable. When a bag is used as the container, then the opening mouth may be heat-sealed. For an inner bag, it is desirable that any excessive dry gas is expelled out of it to reduce the bag inflation and then the bag is filled with a resin.

For filling the packaging container 70 with a predetermined amount of a resin, for example, the amount of the resin may be controlled by a metering unit such as weight-meter (not shown) and, when it has reached a predetermined level, the valve 65 may be shut so as to stop the resin supply to the system.

In the method of the invention, a filter 68 may be disposed in the course of the packing line, as in FIG. 5. The dry gas fed into the system through the dry gas supply duct 63 may enter the filter 68 to fill it, and when a resin to be packaged runs through the filter, the resin is protected from air.

Regarding the method of storing the resin packaged according to the method of the invention, it is desirable that the packaged resin is stored at a temperature not higher than [softening point of the resin −10]° C., depending on the softening point of the resin, more preferably not higher than [softening point of the resin −20]° C.

Examples of the invention are described below, to which, however, the invention should not be limited.

In the following, the water content of the sample was determined according to the same Karl Fisher's method as in the above-mentioned Examples. The melting point was measured through differential scanning calorimetry (DSC); and the molecular weight was determined through GPC under the same condition as in the above-mentioned Examples.

The differential scanning calorimetry was carried out by the use of Seiko Instruments' DSC220C. The condition is as follows: In a nitrogen atmosphere, the sample is heated from room temperature up to 100° C. at a heating rate of 10° C./min, then kept at 100° C. for 1 minute, thereafter cooled from 100° C. to −100° C. at a cooling rate of 5° C./min, then kept at −100° C. for 2 minutes, and again heated from −100° C. up to 100° C. at a heating rate of 5° C./min. The temperature at the exothermic peak during this cycle is read. This is the melting point of the sample.

PRODUCTION EXAMPLE 3-1

150 kg of dewatered toluene was put into a pressure reactor equipped with a stirrer, and 27 g of a catalyst sodium methylate was added thereto and heated up to 100° C. With controlling the reactor to have a pressure of not higher than 200 kPa and a temperature of not higher than 120° C., ethylene oxide, 1,2-butylene oxide and allyl glycidyl ether in a ratio of 90/7/3 (by weight) to reach 100 kg in total were successively added to the reactor, and a resin (polymer) solution was thus obtained.

EXAMPLE 3-1

The solvent was removed from the polymer solution that had been prepared in Production Example 3-1 under reduced pressure, and shaped into a sheet, and then this was pelletized. The resulting resin pellets were dried in a pressure-reducible, powder mixing tank. The polymer had a melting point of 48° C., a molecular weight of 100,000 and a water content after dried of 69 ppm.

The pellets were packaged. As a dry gas, nitrogen gas was led into the packing line from the powder-mixing tank to the packaging container, at a rate of 100 L/min, whereby wet air was prevented from entering the system. On the other hand, nitrogen gas as a dry gas was introduced into an aluminium-laminated bag of polyethylene as the inner face thereof, and the bag was thereby inflated. The aluminium-laminated bag used herein had a three-layered structure of an inner layer of straight-chain low-density polyethylene (80 μm), an interlayer of aluminium (9 μm) and an outer layer of nylon-6,6 (15 μm). The pellets were filled into the container at a filling rate of 20 kg/min, and when they reached 10 kg, the bag was removed from the packing machine. The inner nitrogen gas was purged away, and the opening of the bag was heat-sealed.

The water content of the pellets filled in the packaging bag was measured and was 71 ppm. Thus, any substantial change in the water content was admitted. A weight was put on the bag so that a load of 0.1 kg/cm$^2$ could be applied thereto, and this was kept in a place having a humidity of 80% and a temperature of 25° C. After 2 months, the water content of the packaged resin was 74 ppm, and there was almost no change in it. In addition, the shape of the pellets did not change at all.

COMPARATIVE EXAMPLE 3-1

The pellets were packaged in the same manner as in Example 3-1 except that the packaging bag was changed to a two-layered bag comprising an inner layer of polyethylene (80 μm) and an outer layer of nylon-6,6 (15 μm).

The water content of the pellets filled in the packaging bag was measured, and was 72 ppm. Thus, any substantial increase in the water content was admitted. The packaged bag was left in a place having a humidity of 80% and a temperature of 25° C. After 2 months therein, the water content of the pellets in the bag was measured, it increased up to 265 ppm. The shape of the pellets did not change.

PRODUCTION EXAMPLE 3-2

A resin solution was prepared in the same manner as in Production Example 3-1, for which, however, the monomer composition ratio was changed to EO/BO=92/8.

EXAMPLE 3-2

Under the same condition as in Example 3-1, polymer pellets were formed from the resin solution that had been prepared in Production Example 3-2. The pellets were subjected to moisture control. The polymer had a melting point of 45° C. and a molecular weight of 110,000; and after subjected to moisture control, the water content of the polymer pellets was 3,665 ppm.

The moisture-controlled pellets were packaged. As a dry gas, nitrogen gas was led into the packing line from the powder-mixing tank to the packaging container, at a rate of 100 L/min, whereby wet air was prevented from entering the system. On the other hand, nitrogen gas as a dry gas was introduced into an aluminium-laminated bag of polyethylene as the inner face thereof, and the bag was thereby inflated. The aluminium-laminated bag used herein had a four-layered structure of an inner layer of low-density polyethylene (40 μm), a first interlayer of aluminium (9 μm), a second interlayer of low-density polyethylene (15 μm) and an outer layer of polyethylene terephthalate (15 μm). The pellets were filled into the container at a filling rate of 20 kg/min, and when they reached 10 kg, the bag was removed from the packing machine. The inner nitrogen gas was purged away, and the opening of the bag was heat-sealed.

The water content of the pellets filled in the packaging bag was measured and was 3,645 pm. Thus, any substantial increase in the water content was admitted. A weight was put on the bag so that a load of 0.1 kg/cm$^2$ could be applied thereto, and this was kept in a place having a humidity of 80% and a temperature of 25° C. After 2 months, the water content of the packaged resin was 3,690 ppm, and there was almost no change in it. In addition, the shape of the pellets did not change at all.

COMPARATIVE EXAMPLE 3-2

The resin pellets were packaged in the same manner as in Example 3-2, for which, however, the same two-layered packaging bag of polyethylene/nylon-6,6 as in Comparative Example 3-1 was used. The water content of the packed resin pellets was 3,672 ppm, and there was admitted no increase in it. A weight was put on the packaged bag so that a load of 0.1 kg/cm$^2$ could be applied thereto, and this was kept in a place having a humidity of 80% and a temperature of 25° C. After 2 months, the water content of the packaged resin was measured and it was 13,060 ppm. A significant increase in the water content of the resin was admitted. Further, the pellets were partly deformed.

EXAMPLE 3-3

The resin prepared in Production Example 3-1 was pelletized and packaged in the same manner as in Example 3-1, for which, however, a filter was disposed between the powder mixing tank and the packaging container. The water content of the dried resin was 131 ppm.

The water content of the resin pellets filled in the packaging bag was measured, and was 142 ppm. There was admitted no substantial change in the water content. A weight was put on the packaged bag so that a load of 0.1 kg/cm$^2$ could be applied thereto, and this was kept in a place having a humidity of 80% and a temperature of 25° C. After 2 months, the water content of the packaged resin was 148 ppm, and it changed little. Further, the shape of the pellets did not change at all.

4. Method for Transporting Nonionic Alkylene Oxide-Type Water-Soluble Resin:

In the method for transporting a nonionic alkylene oxide-type water-soluble resin according to the invention, the resin is so controlled that it contains from 0.001 to 50% by weight of a solvent and its viscosity at 40° C. is at most 10,000 Pa·sec, and the resin is loaded into a transportation container equipped with a temperature control capability and/or it is unloaded out of the transportation container by the use of a pump.

In the transportation method of the invention, it is important that the solvent content and the viscosity of the nonionic alkylene oxide-type water-soluble resin to be transported are specifically so controlled that each of these may fall within a specific range to be mentioned below while the resin is transported. The solvent content and the viscosity of the water-soluble resin are indispensable factors in transportation of the resin, as combined with the transportation devices such as the pump and the transportation container mentioned below.

Regarding the solvent content of the nonionic alkylene oxide-type water-soluble resin, it is important that the solvent content of the resin is from 0.001 to 50% by weight relative to the overall amount of the solvent-containing water-soluble resin of being 100% by weight. In the invention, the nonionic alkylene oxide-type water-soluble resin is not limited to one not containing a solvent component at all, but its concept means an ordinary resin that contains any desired amount of a solvent. The solvent component of the nonionic alkylene oxide-type water-soluble resin (the solvent component in the polymer reaction solution that contains a nonionic alkylene oxide-type water-soluble resin and a solvent) generally indicates the solvent that is used in the solvent polymerization method of producing the polymer. However, when any other solvent not used in the solvent polymerization is added to the water-soluble resin (polymerization reaction solution) after the polymerization reaction to produce the polymer, then the additional solvent shall be also within the range of the solvent component of the water-soluble resin (polymerization reaction solution). If the solvent content of the resin is smaller than 0.001% by weight, then the resin may be poorly fluid even though heated, and it may be difficult to transport; but if larger than 50% by weight, then the transportation efficiency of the water-soluble resin may be poor and the solvent may be wasted and, in addition, using such a large amount of solvent may conflict with various rules and regulations (e.g., the Narcotics Control Law and the Psychotropic Drugs Control Law). More preferably, the solvent content of the resin is from 0.01 to 20% by weight, even more preferably from 0.1 to 10% by weight.

Regarding the viscosity of the nonionic alkylene oxide-type water-soluble resin, it is important that the viscosity of the resin at 40° C. is at most 10,000 Pa·sec. If the viscosity of the resin at 40° C. is over 10,000 Pa·sec, then the resin could not be fluidized in melt. More preferably, the viscosity of the resin at 40° C. is at most 9,500 Pa·sec, even more preferably at most 9,000 Pa·sec.

For controlling the solvent content and the viscosity of the nonionic alkylene oxide-type water-soluble resin to be transported according to the transportation method of the invention, employable is any known method with no specific limitation capable of controlling the solvent content and the viscosity of the resin to be transported. For controlling them, for example, employable is a method of adding a solvent to the resin being kneaded, or a method of removing the solvent from the resin through vaporization. In particular, it is desirable that the solvent content and the viscosity of the resin are controlled in a process of solution polymerization with solvent for producing the nonionic alkylene oxide-type water-soluble resin, in which the solvent component is removed (evaporated away) from the polymerization reaction solution containing the nonionic alkylene oxide-type water-soluble resin and the solvent.

The solvent removal from the nonionic alkylene oxide-type water-soluble resin is described below.

For the method of solvent removal from the nonionic alkylene oxide-type water-soluble resin, the apparatus to be used for the solvent removal and various conditions for it, basically employable are any ordinary method of solvent removal, any usable apparatus and any applicable conditions known in the art.

The solvent removal generally includes two steps of pretreatment for solvent removal and treatment for solvent removal. Regarding their order, it is desirable that the pretreatment for solvent removal is followed by the treatment for solvent removal, which, however, is not limitative. The pretreatment and the treatment for solvent removal may not be differentiated and may be attained in one step. The reason why the two-stage solvent removal is desirable is because the two-stage process may increase the solvent removal efficiency and may be therefore effective for reducing the process cost, for shortening the processing time and for improving the resin quality. The two-stage process is theoretically favorable concretely for the reasons that (i) a large amount of the solvent that is contained in the polymerization reaction solution before the solvent removal can be rapidly reduced to a level thereof enough for efficient solvent removal treatment, and thereafter the thus-processed solution can be subjected to gentle solvent removal, (ii) when the former stage is for normal-pressure solvent removal and the latter stage is for vacuum (reduced-pressure) solvent removal, then the device size for the two-stage process may be smaller than that for one-stage treatment, (iii) in solvent removal treatment, the viscosity of the system may rapidly increase within a certain concentration range thereof, and the driving system for the two-stage process may be smaller than that for one-stage treatment. However, depending on the type of the polymerization reaction solution to be processed for solvent removal from it (especially, the type of the resin in the polymerization reaction solution), even one-stage treatment may be effected in the same manner as that for the two-stage treatment (or that is, the two may attain the same result), and therefore, the ways of one-stage or two-stage treatment may be suitably selected for the resin solution.

Though not specifically defined, the device for solvent removal (solvent removal device) is preferably any of stirring tank evaporator, downstream liquid column evaporator, thin film evaporator, surface renewal polymerization reactor, kneader, roll mixer, intensive mixer (Banbury mixer), extruder. Preferably, at least one of these devices is sued herein. Depending on the device used, the service condition for the solvent removal may be suitably determined.

The stirring tank evaporator is excellent in that it is applicable to a broad viscosity range and a broad residual solvent concentration range. Its preferred examples are helical blade-mounted stirring tank, double helical ribbon blade-mounted stirring tank, super-blend blade (inner blade, max-blend blade; outer blade, helical modified baffle)-mounted vertical concentric double-screw stirring tank (e.g., Super-Blend, trade name by Sumitomo Heavy Machinery Industry), VCR reversed conical ribbon blade-type reactor (by Mitsubishi Heavy Industry). These may be used in both of batch treatment and continuous treatment, but are preferably used in bath treatment. Because of the characteristic structure thereof, the devices take a lot of time for discharging the treated product out of them. Therefore, the devices are favorable for a process of accurately processing a small amount of resin, rather than for a process of processing a large amount of resin. When these devices are used, the evaporation is attained by renewing the heat-conductive surface of the devices.

Of the above-mentioned various types of stirring tank evaporators, in particular, the vertical concentric double-screw stirring tank has the good advantages (i) to (vi) mentioned below. (i) The viscosity region of the subject to be processed is broad, and the device exhibits an excellent mixing capability within a viscosity range of from 1 to 1,000 Pa·sec; (ii) following any rapid viscosity change in the tank, the mixing function of the inner and outer blades can naturally vary and correspond to it, and therefore the device can keep a good fluid condition of the system therein; (iii) since the liquid flow rate (flow rate of the polymerization reaction solution) at around the wall face of the device and in the center part thereof can be kept uniform, the device can ensure high temperature uniformity therein and can prevent resin quality deterioration; (iv) a problem of sliding and remaining of a low-viscosity liquid on a high-viscosity liquid can be solved, and the dispersibility of the reflux solution and various additives after polymerization can be improved; (v) in treatment of high-concentration slurry, a problem of adhesion and deposition of the slurry on the tank wall and the baffle can be solved, and good slurry dispersion can be attained; (vi) since the outer blade rotates while kept adjacent to the tank wall face, it produces a stable flow rate at around the wall face to reduce deposition on the inner wall face, and the time and the frequency of washing the inside of the tank may be reduced.

Preferred examples of the downstream liquid column evaporator are multi-tubular heat exchanger-type evaporator (e.g., Sulzer Mixer, trade name by Sumitomo Heavy Machinery Industry; Static Mixer, trade name by Noritake), and plate heat exchanger-type evaporator (e.g., Hiviscous Evaporator, trade name by Mitsui Engineering & Shipbuilding). These may be used in both of batch treatment and continuous treatment, and are favorable for the two. Because of the characteristic structure of the devices, the solvent removal in the devices is first attained by sensible heat and then the sensible heat is converted into latent heat under reduced pressure for solvent evaporation. Therefore, the amount of the solvent removable in the devices depends on the quantity of sensible heat (quantity of heat capable of being applied to liquid as sensible heat). Accordingly, it is desirable that the amount of the liquid to be processed in the devices corresponds to the quantity of sensible heat to be applied to the liquid. In the multi-tubular heat exchanger-type evaporator, the heat conduction can be promoted by a static mixer, and therefore, the evaporator of the type is applicable to a process of treating a large amount of liquid. In the multi-tubular heat exchanger-type evaporator, the evaporation process is promoted by expanding the interfacial surface, and the corresponding maximum processable viscosity is preferably 5,000 Pa·sec. In the plate heat exchanger-type evaporator, the evaporation process is promoted by expanding the heat conduction surface, and the corresponding maximum processable viscosity is preferably 1,000 Pa·sec.

The thin-film evaporator is excellent in that the blade produces centrifugal force and a uniform liquid film is thereby formed. Its preferred examples are horizontal thin-film evaporator (e.g., Evareactor, trade name by Kansai Kagaku Kikai Seisaku), fixed blade-type vertical thin-film evaporator (e.g., EXEVA, trade name by Shinko Pantec), movable blade-type vertical thin-film evaporator (e.g., Waipren, trade name by Shinko Pantec), box-type (mirror-type) thin-film evaporator (e.g., Recovery, trade name by Kansai Kagaku Kikai Seisaku). Of those, horizontal-type and box-type devices would be applicable to batch treatment though not conventional; and vertical devices are not applicable to batch treatment irrespective of the fixed blade type and the movable blade type thereof. However, all the devices are applicable to continuous treatment. Because of the characteristic structure of the devices, the solvent removal in the devices is first attained by sensible heat and then the sensible heat is converted into latent heat under reduced pressure for solvent evaporation. Therefore, the amount of the solvent removable in the devices depends on the quantity of sensible heat (quantity of heat capable of being applied to liquid as sensible heat). Accordingly, it is desirable that the amount of the liquid to be processed in the devices corresponds to the quantity of sensible heat to be applied to the liquid. In these devices, the evaporation is attained by renewing the heat-conductive surface of the devices.

The horizontal thin-film evaporator has a difficulty in discharging a high-viscosity liquid through the discharge face thereof, as compared with the vertical-type evaporator, and therefore, a blade having a good discharging capability is used so that the evaporator is applicable even to high-viscosity liquid. For it, the corresponding maximum processable viscosity is preferably 50 Pa·sec. In the vertical thin-film evaporator, the liquid being processed may move down owing to its self-weight, and therefore the evaporator of the type is favorable for high-viscosity liquid rather than for low-viscosity liquid, and corresponding maximum processable viscosity for the movable blade-type evaporator is preferably 100 Pa·sec. On the other hand, in the fixed blade-type evaporator, the fixed blade is so modified that it may act as a scraper, and the evaporator is therefore applicable to high-viscosity liquid. For the evaporator of the type, the corresponding maximum processable viscosity is preferably 1,000 Pa·sec. In the box-type thin-film evaporator, short-pass of low-viscosity liquid may be inhibited by utilizing a mirror, and for the device, the corresponding maximum processable viscosity is preferably 100 Pa·sec.

The surface renewal-type polymerization reactor (horizontal thin-film polymerization reactor) is excellent in that it exhibits a high solvent removal capability through vapor-liquid interface renewal attained therein. Its preferred examples are single screw-type surface renewal polymerization reactor, double screw-type surface renewal polymerization reactor (e.g., Bivolac, trade name by Sumitomo Heavy Machinery Industry; Hitachi Eyeglass Blade Polymerization Reactor, trade name by Hitachi; Hitachi Lattice Blade Polymerization Reactor, trade name by Hitachi; SC Processor, trade name by Kurimoto Tekkojo). These are not applicable to batch treatment, but are applicable to continuous treatment. Because of the characteristic structure thereof, the capability for solvent removal of all these devices depends on the moving speed of the substance in the devices. In these devices, the evaporation is attained by renewing the heat-conductive surface of the devices.

The kneader, the roll mixer and the intensive mixer (Banbury mixer) are suitable to high-viscosity flux liquid, like extruder, and they have a solvent removal capability as an additional function thereof. These are applicable to both batch treatment and continuous treatment. For these, the corresponding maximum processable viscosity is preferably 1,000 Pa·sec.

The single screw-type evaporator exhibits a high solvent removal capability as it may ensure an efficient surface area, and for it, the corresponding maximum processable viscosity is preferably 1,000 Pa·sec. The double screw-type evaporator is excellent in that it has no dead space in the container, it ensures a smooth piston flow movement and a good self-cleaning capability, and it prevents liquid from staying therein. For this, the corresponding maximum processable viscosity is preferably 1,000 Pa·sec.

The extruder is suitable for mixing high-viscosity flux liquid, and its additional functions are for heating, melting, kneading and solvent removal. Its preferred examples are single-screw extruder, double-screw extruder (e.g., SUPERTEXαII, trade name by Nippon Seikosho; BT-30-S2, trade name by Plastic Kogaku Kenkyujo), SCR self-cleaning-type reactor (by Mitsubishi Heavy Industry). These are not applicable to batch process, but are all applicable to continuous process. Because of the characteristic structure thereof, these devices are favorable to a process of solvent removal from liquid of very high viscosity, as so mentioned herein above. The evaporation for solvent removal in these devices is attained through kneading and vaporization.

For both the single-screw extruder and the double-screw extruder, the corresponding maximum processable viscosity is preferably 10,000 Pa·sec.

As so mentioned hereinabove, one preferred method for solvent removal in the invention comprises pretreatment for solvent removal followed by treatment for solvent removal. Of the above-mentioned various solvent removal devices, those favorable for pretreatment for solvent removal are, though not specifically defined, double helical ribbon blade-mounted stirring tank, super-blend blade-mounted vertical concentric double-screw stirring tank, plate heat exchanger-type downstream liquid column evaporator, and fixed blade-type vertical thin-film evaporator. Also though not specifically defined, the devices that are favorable for treatment of solvent removal that follows the pretreatment thereof are fixed blade-type vertical thin-film evaporator, double-screw surface renewal-type polymerization reactor, kneader, and double-screw extruder.

For solvent removal from the nonionic alkylene oxide-type water-soluble resin (that is, for solvent removal from the polymerization reaction solution that contains the water-soluble resin and a solvent), any of the above-mentioned various solvent removal devices may be directly connected to the former-stage line in the process of solution polymerization with solvent to give the polymer so that the solvent removal from the polymer solution may be directly effected therein; or alternatively, the polymer solution may be transferred from the former-stage line in the polymer production process into any of the solvent removal devices in which the solvent may be remove from the polymer solution. For the latter, for example, employable is a system in which the former-stage device and the solvent removal device are connected to each other via a liquid feeding line; or a system in which a intermediate tank (cushion tank) equipped with a jacket and/or a stirrer is disposed in the line between the former-stage device and the solvent removal device.

In carrying out the transportation method of the invention, it is desirable that the residual solvent concentration in the nonionic alkylene oxide-type water-soluble resin is previously controlled to fall within the above-mentioned specific solvent concentration range, by processing the resin for solvent removal as above. However, the treatment for solvent removal is not specifically so defined that the solvent content of the processed resin could fall within the above-mentioned specific solvent concentration range. Apart from it, the solvent content of the resin may be controlled to be lower than the above-mentioned specific solvent concentration range, and just before the resin is transported, a predetermined solvent may be added to it so that the solvent content of the resulting resin could fall within the above-mentioned specific solvent concentration range.

In carrying out the transportation method of the invention, it is desirable that the water content of the nonionic alkylene oxide-type water-soluble resin is previously controlled simultaneously with the treatment for solvent removal from the resin as above. However, the treatment for controlling the water content of the resin to a desired level is not specifically defined to be done in the solvent removal step. If desired, the water content of the resin may be controlled to a desired level in any step or stage before the resin is transported. The water content results from, for example, the solvent and the monomer used in polymerization. Concretely, it is desirable that the water content of the nonionic alkylene oxide-type water-soluble resin is previously controlled to at most 300 ppm in the step of solvent removal from the resin. If the water content of the resin is over 300 ppm, then the dielectric constant of the resin maybe higher than the necessary level. If so, when the nonionic alkylene oxide-type water-soluble resin obtained herein is used, for example, for a protective film for color filters, then the resin may be conductive and may cause a fatal function depression for the protective film. In addition, water in the resin may react with metal ions to form hydroxides. As a result, for example, when the nonionic alkylene oxide-type water-soluble resin is used in an electrolyte layer of polymer cells, then it may form an insulating layer in the metal/electrolyte layer interface. In such a case, the voltage may continuously increase under a constant current, and the cycle characteristics of the cells may be thereby worsened.

The concrete method of controlling the water content of the resin is not specifically defined. For it, for example, the temperature in solvent removal may be made higher and/or the vacuum degree in solvent removal may be made higher. These are preferable for the water content control. (Increasing the vacuum degree means that the pressure in the process is reduced more; and on the contrary, decreasing the vacuum degree means that the pressure in the process is not reduced so much.) When the temperature insolvent removal is made higher for controlling the water content of the resin, the temperature level is not specifically defined. However, if the temperature is too low, then it is not efficient since the vacuum degree in the system must be excessively increased; but if too high, it is also unfavorable since the resin may be thermally deteriorated. Accordingly, the temperature is suitably determined in consideration of these. When the vacuum degree in solvent removal is increased for controlling the water content of the resin, then the vacuum degree level is not specifically defined. However, if too much increased, then the process may be difficult in consideration of the sealability of the solvent removal device; but if the vacuum degree is increased too small, then the water content of the resin could not be controlled to fall within the desired range if the temperature in solvent removal is not increased to an extremely high temperature. Therefore, the vacuum degree in the process is suitably determined in consideration of these.

In carrying out the transportation method of the invention, it is desirable that the viscosity of the nonionic alkylene oxide-type water-soluble resin is previously controlled to fall within the above-mentioned specific viscosity range, simultaneously with the treatment for solvent removal from the resin as above. However, the treatment for controlling the viscosity of the resin to fall within the above-mentioned specific range in the solvent removal step is not specifically defined. If desired, the viscosity of the resin may be controlled to overstep the above-mentioned specific viscosity range, and a predetermined solvent may be added to the range so as to make the resulting resin have a viscosity falling within the above-mentioned specific viscosity range.

When the solvent is removed from the polymerization reaction solution that contains the nonionic alkylene oxide-type water-soluble resin and solvent, by the use of the above-mentioned solvent removal device and by heating the solution, then the temperature of the system preferably falls between 40 and 300° C., more preferably between 60 and 250° C., even more preferably between 90 and 200° C. The solvent removal within the temperature range facilitates the production of the nonionic alkylene oxide-type water-soluble resin having the desired residual solvent concentration (solvent content) and the desired viscosity as above. If the temperature is lower than 40° C., then the remaining solvent in the resin may increase; but if higher than 300° C., then the nonionic alkylene oxide-type water-soluble resin may be thermally decomposed. The above-mentioned temperature is the temperature of the nonionic alkylene oxide-type water-soluble resin in the solvent removal device.

Similarly, in solvent removal by the use of the above-mentioned solvent removal device, the pressure preferably falls between 13 and 100,000 Pa, more preferably between 133 and 70,000 Pa, even more preferably between 1,333 and 40,000 Pa. The solvent removal within the defined pressure range facilitates the production of the nonionic alkylene oxide-type water-soluble resin having the desired residual solvent concentration (solvent content) and the desired viscosity as above. If the pressure is lower than 13 Pa, then the solvent may flash and may cause foaming; but if higher than 100,000 Pa, then the nonionic alkylene oxide-type water-soluble resin may require a high temperature at which, however, the resin may decompose. The above-mentioned pressure is the pressure inside the reactor of the solvent removal device.

In the transportation method of the invention, the nonionic alkylene oxide-type water-soluble resin is put in a transportation container of which the temperature may be controlled to a desired level, and transported therein.

Preferably, the temperature is so controlled that it is over the melting temperature of the nonionic alkylene oxide-type water-soluble resin to be put into the transportation container but is not higher than the thermal decomposition temperature of the water-soluble resin, concretely falling between 35° C. and 200° C., more preferably between 40° C. and 130° C.

In the transportation method of the invention, when the transportation container containing the nonionic alkylene oxide-type water-soluble resin to be transported therein has an empty space, then the empty space is preferably substituted with dry air having a dew point of not higher than −40° C. (the water content of dry water having a dew point of not higher than −40° C. is 127 ppm) for the purpose of preventing the resin from being wetted by the remaining water, more preferably with dry air having a dew point of not higher than −50° C. (the water content of dry water having a dew point of not higher than −50° C. is 39 ppm). For the purpose of preventing the reduction in the reactive group in the resin owing to the remaining oxygen, it is desirable that the empty space is substituted with a gas that contains at least 99% by volume of an inert gas. The inert gas includes, for example, nitrogen, argon and helium. The gas that contains the above-mentioned inert gas must be so selected that it has a low water content in order that the level of the water content of the resin being transported could be kept low (for example, at most 300 ppm, preferably at most 250 ppm, more preferably at most 200 ppm).

The transportation container is not specifically defined. In general, its preferred examples are ISO containers and bulk containers. One or more of these maybe selected and used either singly or as combined. Above all, ISO containers are more preferred.

The ISO container is so designed that a cylindrical barrel is laid on its side and its periphery is fixed with a metal frame or the like so that it can be dealt with like a container as a whole. At the bottom of one end of the cylindrical barrel (the lower part of the side of the container), this has a valve that is connectable with a pump, and via the valve, the nonionic alkylene oxide-type water-soluble resin put into the barrel can be discharged out, and as the case may be, the barrel may be charged with the resin via it and may be used as a tank.

Further, the ISO container is provided with a network-structured heater coil at the bottom of the outer surface of the cylindrical barrel. The coil is tubular by itself, and pressure steam or hot water may be led through the coil so as to heat the inside of the barrel.

In the transportation method of the invention, the nonionic alkylene oxide-type water-soluble resin is charged into the above-mentioned transportation container and/or is discharged out of the container via a pump.

Not specifically defined, the pump may be any ordinary one capable of sucking in a high-viscosity resin and jetting it out. Preferably, however, the pump is mono pump (e.g., Mono Pump, trade name by Heishin Sobi) or gear pump (e.g., Gear Pump, trade name by Shimadzu Seisakusho). One or more of these may be suitably used. For charging the resin into the transportation container and/or for discharging the resin from the transportation container, the pump is more preferably directly connectable with the container.

The mono pump have the following advantages: (i) The mode of sucking in and jetting out may be readily switched to each other by merely changing the shaft rotation direction of the same pump, and the pump exhibit the same high capability in either mode. (ii) The transfer flow is at any time constant with no pulsation, and is not stirred. Therefore, the transfer flow of resin is neither deteriorated nor damaged. (iii) A wide-range flow control is possible in any desired manner merely by controlling the shaft rotation speed, and the pump can rapidly respond to the control signal applied thereto. Therefore, the pump enables transportation under flow rate control, and enables automatic control thereof. (iv) The pump is widely applicable to various types of fluids irrespective of their physical properties (e.g., water-like to high-viscosity and high-concentration slurry, bubbles-containing liquid, powder), and applicable to any degree of capacity, pressure and pH. (v) The pump does not leak vapor and transfer flow out of it at all, and causes no trouble of odor, noise and dust.

The gear pump is excellent in that it enables liquid transportation in a broad range of from low viscosity to high viscosity, and further enables vacuum to vacuum liquid transportation, and, in addition, since it ensures a fine clearance, its flow rate reproducibility is high.

The transportation system for the method of transporting the nonionic alkylene oxide-type water-soluble resin of the invention is not specifically defined. For example, the above-mentioned transportation container (and pump) may be integrally (permanently) fitted to an actual transportation means (e.g., ship, car, train), and the transportation system of the type may be used for the method of the invention; or differently from it, the above-mentioned transportation container (and pump) maybe detachably fitted to such an actual transportation means when it requires the transportation capability of the actual transportation means.

The invention is described more concretely with reference to the following Examples, to which, however, the invention should not be limited. For convenience' sake, "part by weight" may be simply expressed as "part".

EXAMPLE 4-1

<Packing in Transportation Container>

In a polymerization reactor equipped with a thin-film evaporator, a double-screw extruder and a super-blend blade, a nonionic alkylene oxide-type water-soluble resin (1) containing 5% by weight of a solvent of toluene (its viscosity at 40° C. is 4,000 Pa·sec) was produced, and the water-soluble resin (1) was melted under heat at 110 to 125° C. The water-soluble resin (1) is a resin comprising ethylene oxide-derived structure units, butylene oxide-derived structure units and allyl glycidyl ether-derived structure units in a ratio of 378 parts, 25.2 parts and 16.8 parts, respectively, and having a weight-average molecular weight of 100,000.

Next, the discharge line of the polymerization reactor was heated with a steam trace (steam temperature, about 120° C.; steam pressure, 0.196 MPa), and the mono pump (Heishin Sobi's trade name, NE30A Model) connected to the discharge line was started and its revolution was gradually increased. With the pump revolution kept at from 60 to 86 rpm, the water-soluble resin (1) was discharged out of the polymerization container at a discharge flow rate of from 83 to 90 kg/hr, and this was packed into a large-size metal container (ISO container).

EXAMPLE 4-2

<Discharge from Transportation Container>

Steam (steam temperature, about 140 to 145° C.; steam pressure 0.392 MPa) was led through the heating coil of a large-size metal container (ISO container) filled with a nonionic alkylene oxide-type water-soluble resin (2) containing 5% by weight of a solvent toluene (its viscosity at 40° C. is 4,000 Pa·sec), and the water-soluble resin (2) in the container was thereby heated up to 120° C. and melted. The water-soluble resin (2) is a resin comprising ethylene oxide-derived structure units and butylene oxide-derived structure units in a ratio of 200 parts and 25 parts, respectively, and having a weight-average molecular weight of 110,000.

Next, a large-size metal container (ISO container) was pressurized by introducing nitrogen thereinto (gauge pressure; 0.147 MPa), and its discharge line was heated with a steam trace (steam temperature, about 120° C.; steam pressure, 0.196 MPa) With that, the mono pump (Heishin Sobi's trade name, NE30A Model) connected to the discharge line was started and its revolution was gradually increased. With the pump revolution kept at from 60 to 86 rpm, the water-soluble resin (2) was discharged out of the large-size metal container (ISO container) at a discharge flow rate of from 83 to 90 kg/hr, and this was transferred into a solvent removal device with a double-screw extruder connected thereto.

COMPARATIVE EXAMPLE 4-1

<Packing in Transportation Container>

In the same polymerization reactor as in Example 4-1, a nonionic alkylene oxide-type water-soluble resin (c1) containing 10% by weight of a solvent of toluene (its viscosity at 40° C. is 50,000 Pa·sec) was produced, and the water-soluble resin (c1) was melted under heat at 250° C. The water-soluble resin (c1) is a resin comprising ethylene oxide-derived structure units, butylene oxide-derived structure units and allyl glycidyl ether-derived structure units in a ratio of 378 parts, 25.2 parts and 16.8 parts, respectively, and having a weight-average molecular weight of 1,000,000.

Next, the discharge line of the polymerization reactor was heated with a steam trace (steam temperature, about 120° C.; steam pressure, 0.196 MPa), and the mono pump (Heishin Sobi's trade name,. NE30A Model) connected to the discharge line was started and its revolution was gradually increased. In this process, however, since the molecular weight of the water-soluble resin (c1) increased (that is, the resin degraded and deteriorated), the resin could not be discharged out of the polymerization reactor, and therefore it could not be transferred into a large-size metal container (ISO container)

COMPARATIVE EXAMPLE 4-2

<Discharge from Transportation Container>

Steam (steam temperature, about 140 to 145° C.; steam pressure 0.392 MPa) was led through the heating coil of a large-size metal container (ISO container) filled with a nonionic alkylene oxide-type water-soluble resin (c2) containing 0.0001% by weight of a solvent toluene (its viscosity at 40° C. is 20,000 Pa·sec), and the water-soluble resin (c2) in the container was thereby heated up to 120° C. The water-soluble resin (c2) is a resin comprising ethylene oxide-derived structure units, butylene oxide-derived structure units and allyl glycidyl ether-derived structure units in a ratio of 378 parts, 25.2 parts and 16.8 parts, respectively, and having a weight-average molecular weight of 500,000.

Next, a large-size metal container (ISO container) was pressurized by introducing nitrogen thereinto (gauge pressure; 0.147 MPa), and its discharge line was heated with a steam trace (steam temperature, about 120° C.; steam pressure, 0.196 MPa) With that, the mono pump (Heishin Sobi's tradename, NE30A Model) connected to the discharge line was started and its revolution was gradually increased. However, the water-soluble resin (c2) did not almost melt even though heated at 120° C. for a long period of time (that is, it could not be in a good fluidized condition), and was extremely difficult to discharge out of the large-size metal container (ISO container) and to transfer into a solvent removal device with a double-screw extruder connected thereto. The process lacks good process ability and safety and is expensive, and it took a lot of time.

What is claimed is:

1. A method for drying a nonionic alkylene oxide polymer water-soluble resin, which comprises putting a nonionic alkylene oxide polymer water-soluble resin into a container, degassing the container to a vacuum degree of at most 150 mmHg inside the container, and, with the vacuum degree in the container kept as such, introducing a dry gas having a dew point not higher than the dew point DP calculated according to the following formula (1), into the container at an introduction rate not lower than the introduction rate V calculated according to the following formula (2):

$$DP(° C.) = -21.6 \log_{10} Vac \quad (1),$$

$$V(\text{L/min}) = 0.5 \times [Vac/(273+T)] \times V_0 \quad (2),$$

wherein Vac, T and $V_0$ have the following meanings:
Vac indicates the vacuum degree (mm Hg),
T indicates the temperature inside the container (° C.),
$V_0$ indicates the volume of the container (L), wherein
the alkylene oxide polymer water-soluble resin to be dried is powder or pellets of the resin and wherein the resin contains at least 50% by weight of alkylene oxide structure units, the alkylene oxide structure units contain at least 60% by weight of ethylene oxide structure units, and the resin has a melting point of not higher than 90° C., a glass transition point of from −100 to −30° C., a crystallization temperature of not higher than 50° C. and a weight-average molecular weight of from 20,000 to 500,000.

2. A nonionic alkylene oxide polymer water-soluble resin dried according to the drying method of claim 1.

3. A method for drying a nonionic alkylene oxide polymer water-soluble resin that contains minor volatiles, which comprises drying the resin by the use of a device that comprises an evaporation tank where the resin is put in and a stirring blade which revolves inside the evaporation tank as it rotates on its own axis, wherein
said drying comprises degassing the evaporation tank and introducing a dry gas having a dew point of not higher than −40° C. into the evaporation tank from a bottom of said evaporation tank as a carrier gas therein,
the evaporation tank is substantially conical or cylindrical,
the stirring blade is fitted along a wall face of the tank, and
a flow rate of the carrier gas falls between 0.1 and 0.3 in terms of a ratio of a carrier gas flow rate in L/min to a resin amount in kg.

4. The drying method as claimed in claim 3, wherein a temperature of the carrier gas is controlled to fall within a range of a crystallization temperature (Tc) of the resin to be dried ±10° C.

5. The drying method as claimed in claim 3, wherein the resin is prevented from being fused or deteriorated by stirring the resin in a mode of low-speed stirring or intermittent stirring.

6. The drying method as claimed in claim 3, wherein a necessary drying time is estimated according to the following formula (3):

$$\text{Necessary Drying Time } T(\min) = [(a-b) \times c/(a \times d \times e)] \quad (3),$$

wherein a indicates an initial volatile concentration (ppm); b indicates an intended volatile concentration (ppm); c indicates an amount of the resin fed into the system (kg); d indicates a drying coefficient (kg/L); e indicates an amount of the carrier gas introduced (L/min), and a drying coefficient d is represented by the following formula:

> Drying Coefficient $d$(kg/L)=[(volatile concentration before drying−volatile concentration after drying)×amount of resin fed into the system]/(time×volatile concentration before drying×amount of gas introduced into the system), in which a unit of each numerical value is as follows:

Volatile concentration: ppm,
Amount of resin fed: kg,
Time: min,
Amount of gas introduced: L/min.

7. A nonionic alkylene oxide polymer water-soluble resin dried according to the drying method of claim 3.

8. A method for transporting a nonionic alkylene oxide polymer water-soluble resin, which comprises controlling the resin so as to have a solvent content of from 0.001 to 50% by weight and a viscosity at 40° C. of at most 10,000 Pa·sec, and loading the resin into a transportation container equipped with a temperature control capability and/or unloading the resin out of the transportation container by the use of a pump, wherein a temperature control in the transportation container is attained within a range higher than the glass transition temperature of the resin but falling between a melting temperature of the resin and 200° C.

9. The method for transporting a nonionic alkylene oxide polymer water-soluble resin as claimed in claim 8, wherein the solvent contains at least one selected from a group consisting of toluene, xylene, heptane, cyclohexane and aqueous solution.

10. The method for transporting a nonionic alkylene oxide polymer water-soluble resin as claimed in claim 8, wherein the pump is any of a mono pump or a gear pump.

11. The method for transporting a nonionic alkylene oxide polymer water-soluble resin as claimed in claim 8, wherein the transportation container equipped with a temperature control capability is an ISO container.

* * * * *